United States Patent
Smith, Sr.

(10) Patent No.: US 10,414,384 B2
(45) Date of Patent: Sep. 17, 2019

(54) PORTABLE SEMI-TRAILER LANDING-GEAR MOTOR SYSTEM AND METHOD

(71) Applicant: Lionel Smith, Sr., New Orleans, LA (US)

(72) Inventor: Lionel Smith, Sr., New Orleans, LA (US)

(*) Notice: Subject to any disclaimer, the term of this patent is extended or adjusted under 35 U.S.C. 154(b) by 221 days.

(21) Appl. No.: 15/618,886

(22) Filed: Jun. 9, 2017

(65) Prior Publication Data

US 2017/0356533 A1    Dec. 14, 2017

Related U.S. Application Data

(60) Provisional application No. 62/348,046, filed on Jun. 9, 2016.

(51) Int. Cl.
*B60S 9/08*   (2006.01)
*B66F 3/18*   (2006.01)
*B66F 3/44*   (2006.01)
*F16H 13/04*  (2006.01)

(52) U.S. Cl.
CPC .............. *B60S 9/08* (2013.01); *B66F 3/18* (2013.01); *B66F 3/44* (2013.01); *F16H 13/04* (2013.01)

(58) Field of Classification Search
CPC ...... B60S 9/04; B60S 9/06; B60S 9/08; B60S 9/18; F16H 13/04; F16H 13/10; F16H 1/16; F16H 3/00; F16H 13/02; F16H 19/02; F16H 55/02; F16H 61/644; B66F 3/08; B66F 3/18; B66F 3/44

USPC ...... 74/567–569, 89.14, 425; 476/15, 19, 65
See application file for complete search history.

(56) References Cited

U.S. PATENT DOCUMENTS

| | | | |
|---|---|---|---|
| 640,770 A * | 1/1900 | Howell | F16H 13/10 476/28 |
| 3,487,705 A * | 1/1970 | Fox | F16H 13/02 476/61 |
| 4,097,840 A | 6/1978 | Chappelle | |
| 5,451,076 A | 9/1995 | Burkhead | |
| 5,911,437 A * | 6/1999 | Lawrence | B60S 9/10 254/419 |
| 6,010,154 A | 1/2000 | Payne et al. | |
| 6,086,099 A | 7/2000 | Kingsbury | |
| 6,224,103 B1 | 5/2001 | Hatcher | |
| 6,260,882 B1 | 7/2001 | Kingsbury | |
| 6,434,982 B1 | 8/2002 | Rowland | |
| 6,846,016 B2 | 1/2005 | VanDenberg et al. | |
| 7,021,659 B2 | 4/2006 | McGrew | |
| 7,163,207 B2 * | 1/2007 | Baird | B60P 1/56 254/419 |
| 7,240,921 B2 | 7/2007 | Baxter | |
| 7,258,363 B2 | 8/2007 | Baxter | |

(Continued)

*Primary Examiner* — Joseph M Rocca
*Assistant Examiner* — Maurice L Williams
(74) *Attorney, Agent, or Firm* — Keaty Law Firm LLC

(57) ABSTRACT

A portable semi-trailer landing-gear motor system and method for use in raising and lowering landing gear on a variety of different semi-trailers by motorized turning of the various-sized drive shafts of the landing gears in appropriate opposing directions, providing motorized performance of an otherwise physically difficult procedure, providing transportability and easy storage within a tractor or truck for use on a variety of semi-trailers in various locations and under various conditions.

20 Claims, 9 Drawing Sheets

(56) References Cited

U.S. PATENT DOCUMENTS

| | | |
|---|---|---|
| 7,303,210 B2 | 12/2007 | Baxter |
| 7,311,332 B2 | 12/2007 | Baxter et al. |
| 8,317,225 B2 | 11/2012 | Muller et al. |
| 8,590,417 B1 | 11/2013 | Bono et al. |
| 8,746,649 B2 * | 6/2014 | Haynes ................. B64C 27/001 248/635 |
| 2006/0117890 A1 * | 6/2006 | Li ........................... F16H 37/06 74/425 |
| 2007/0209857 A1 * | 9/2007 | Wolf ................... B60N 2/0232 180/315 |
| 2008/0271556 A1 * | 11/2008 | Imamura ........... F16H 57/02004 74/412 R |
| 2009/0071279 A1 * | 3/2009 | Huck ................... E05F 15/689 74/425 |
| 2015/0224838 A1 * | 8/2015 | Laarman .................. B60S 9/08 280/766.1 |

* cited by examiner

PORTABLE SEMI-TRAILER LANDING-GEAR MOTOR SYSTEM AND METHOD

CROSS-REFERENCE TO RELATED APPLICATIONS

This application claims priority to my provisional application Ser. No. 62/348,046, filed Jun. 9, 2016 for an "Electrical motor and gears that rotate the shaft of a jack," the full disclosure of which is incorporated by reference herein and priority of which is hereby claimed.

BACKGROUND

This invention provides a portable semi-trailer landing-gear motor system and method for use in raising and lowering landing gear on a variety of different semi-trailers, by use of motorized turning of the various-sized drive shafts of the landing gears.

Semi-trailers are called that because they do not have a set of front wheels, instead featuring only back wheels. The "front" wheels are instead provided by the tractor or truck pulling the semi-trailer. A king pin on the semi-trailer engages with a fifth wheel receptacle on the tractor, and the rear wheels of the tractor support the front of the semi-trailer. When the tractor is removed, the semi-trailer must rest on landing gear structures. The landing gear is a pair of extendable and retractable legs operated by a geared jack, which is driven by a drive shaft, which is in turn driven by a removable or repositionable jack handle. Manual operation of the landing gear is physically taxing work, and accordingly difficult manual labor.

The landing gear and jacking mechanism are part of the semi-trailer, not a part of the tractor or truck. A truck driver might own or be assigned to a single truck, and use that same truck every day, but that same truck driver might haul a variety of different semi-trailers over a short period of time. These semi-trailers, in turn, might have different ownership. Additionally, there are variations in the design, placement, and dimensions of the landing gear from trailer to trailer. A trucker might have to operate several different landing-gear configurations in a short period of time, and such operation is likely to take place in a variety of pick-up and drop-off locations, sometimes under difficult weather or other conditions.

The physical difficulty of manual operation of the landing-gear jacks of semi-trailers might place a limit on who can work as a truck driver. A person might have all other necessary qualifications, but not have the upper-body strength to operate the landing-gear jacks.

There is therefore a need for a way to operate landing-gear jacks with a motor, which should be portable enough to travel with the trucker and should also be able to fit and to operate a variety of jacks without altering, marring, or damaging the landing gear.

U.S. Pat. No. 8,590,417 was issued to inventors James G. Bono and Mike N. K. Chen on Nov. 26, 2013 for a "Trailer Landing Gear Apparatus," covering an apparatus for rotating a drive shaft of a trailer's landing gear, lifting gear, dolly or like mechanism for use in raising and lowering the legs or supports of the mechanism. Namely, said apparatus comprises of an attachable drive shaft connector, coupled with a drive gear apparatus engaged with a rotary drive apparatus, allowing for the rotation of the drive shaft of a landing gear or lifting gear of a land vehicle.

U.S. Pat. No. 6,846,016, covering a "Trailer Landing Gear" as invented by Ervin VanDenberg et al., was issued to assignee Jost-Werke GmbH & Co. KG on Jan. 25, 2005. Said invention discloses a landing gear assembly for a semi-trailer that includes a pair of legs that may be simultaneously raised or lowered by turning a single crank. Notably, each leg is configured to be mounted in either an inboard or outboard configuration, as achieved by providing both sides of each leg with no protrusions that extend beyond the space provided in the mounting bracket and the mounting hole used to connect the landing gear to the semi-trailer. Furthermore, the landing gear assembly includes a floor base that receives and supports the input shaft, and a cover is used to support the input ends of the input shaft and the output shaft. The cover is connected to the input side of the upper tube of the leg and allows the gear assembly to be easily assembled within the perimeter of the upper leg.

U.S. Pat. No. 8,317,225, covering a "Semi-Trailer Landing Gear" as invented by Gerald Müller et al., was issued to assignee Jost-Werke GmbH on Nov. 27, 2012. The disclosed semi-trailer landing gear was developed as an economical approach to support trailers by incorporating a support element that comprises of an outer sleeve incorporating a fastening flange, forming a single piece of flat steel fabricated by edge rolling and allowing for securing onto a vehicle, and also an inner sleeve, which are in conjunction able to be displaced in a vertically telescopic manner, withstanding high loads when propping up trailers.

U.S. Pat. No. 7,240,921 issued to assignee Baxter Properties LLC on Jul. 10, 2007 for a "Landing Gear Assembly for a Trailer." The assembly, as invented by Bobby G. Baxter, discloses a landing gear assembly for supporting a trailer detached from a truck. Namely, said assembly comprises of two legs, each configured to selectively extend and retract in length, connected by a member that is rotatable about an axis relative to the trailer and is axially movable between a first position and a second position. In particular, each leg is configured to extend in length a first and second amount per revolution of the connecting member about the axis of the connecting member when the connecting member is in the corresponding first position and second position.

U.S. Pat. No. 7,258,363 was issued on Aug. 21, 2007 to Baxter Properties LLC, and also discloses a "Landing Gear Assembly for a Trailer." The apparatus, as invented by Bobby G. Baxter, covers a landing gear assembly for supporting the front end of a detached trailer.

Specifically, the '363 patent covers a landing gear comprising a first leg and a second leg, each leg having a housing, an input shaft, a gear mechanism, and an extension portion, the housing being adapted to connect the leg to a trailer, the input shaft extending through the housing and being movable between a first and second position and also being rotationally movable, and the gear mechanism being operatively connected to the input shaft such that the input shaft engages the low gear when in the second position and engaging the high gear when in the first position. The extension portion is telescopically movable with respect to the housing, and is operatively connected to the gear mechanism such that the rotation of the input shaft moves the extension portion with respect to the housing. The first and second legs of the assembly are adapted to be attached to a trailer end and connected to one another with a cross shaft, such that when the input shaft of one of the first and second legs is moved to the first position, the input shaft of the other leg is moved to the first position, and vice versa, and when the input shaft of one of the first and second legs is rotated one revolution, the input shaft of the other leg is also rotated one revolution.

U.S. Pat. No. 7,303,210 was also invented by Bobby G. Baxter, and issued to assignee Baxter Properties LLC on Dec. 4, 2007 for a "Secure Crank Locking Device for Trailer Landing Gear Assembly." The disclosed crank locking device automatically secures a hand crank in its operative position to an input shaft of a gearing mechanism, whereby the locking device may be easily disengaged to move the crank from its operative position to a stored position following the manual rotation of the crank in the operation of the mechanism, allowing to selectively lower and raise a landing gear assembly of a truck trailer.

U.S. Pat. No. 7,311,332 was issued to assignee Baxter Properties LLC on Dec. 25, 2007 for a "Speed Crank Locking Device for Trailer Landing Gear Assembly," as invented by David A. Baxter and Bobby G. Baxter. The manual drive apparatus provides input rotation to a mechanism, with the apparatus comprising (i) an input shaft having an axis of rotation and a shaft end; (ii) a crank connected to the shaft end for movement of the crank between a stored position where the crank is beside the shaft, and an operative position where an end of the crank is axially aligned with an end of the shaft; and (iii) a lock member mounted on the crank for movement of the lock member between locked and unlocked positions of the lock member relative to the shaft, where the lock member engages over the end of the shaft when the lock member is in the locked position, and the lock member being positioned adjacent a side of the shaft when the lock member is in the unlocked position; where the lock member is mounted on the crank for movement of the lock member relative to the crank.

U.S. Pat. No. 7,021,659 was issued to David L. McGrew on Apr. 4, 2006 for a "Semi-Trailer Landing Gear Ratcheting Apparatus," covering a foldable ergonomic cranking apparatus for support when manually raising and lowering the landing gear of a semi-trailer. Namely, said apparatus includes a rotatable mechanism that is permanently connected to the cross-shaft of the landing gear and is foldable such that the mechanism is positioned beneath the trailer when in storage position.

U.S. Pat. No. 6,434,982, issued to James E. Rowland on Aug. 20, 2002 for a "Lock for Tractor Trailer Landing Gear," discloses a lock device for securing a lowered or non-lowered landing gear handle of a tractor trailer. Namely, the disclosed lock comprises of two hinged interlocking halves, configured around the landing gear handle, secured by a shaft-type keyed locking cylinder that has a pin intersecting apertures in flanges of the halves.

U.S. Pat. No. 6,086,099 issued to Quest Transportation Products, Inc. on Jul. 11, 2000 for a "Trailer Landing Gear Lifting Apparatus," as invented by Richard A. Kingsbury, disclosing a pneumatically powered landing gear apparatus for raising and lowering the landing gear of semi-trailers, particularly large commercial semi-trailers, aiming to provide an alternative to hand cranking the landing gear thereof. Namely, the disclosed invention comprises of a wrench connected by an air hose to an air supply line and, optionally, to an air tank, and additionally a bracket attached to said wrench and adapted for securing said wrench to a pair of I beams of the semi-trailer.

U.S. Pat. No. 6,260,882 was issued to Quest Transportation Products, Inc. on Jul. 17, 2001 for a "Trailer Landing Gear Lifting Apparatus," as invented by Richard A. Kingsbury. The disclosed invention discloses a lifting apparatus for raising and lowering the landing gear of semi-trailers, particularly large commercial semi-trailers, aiming to provide an alternative to hand cranking the landing gear thereof. Namely, the disclosed invention comprises of an electric motor with a motor gear affixed to a motor shaft, whereby the motor gear engages a gear of the landing gear, and a spacer for locking the landing gear in a low gear position.

U.S. Pat. No. 6,224,103, as issued to Edwin Bruce Hatcher on May 1, 2001, discloses a "Control System for Electrically-Operated Trailer Landing Gear," illustrating a powered landing gear arrangement for selectively extending and retracting the landing gear legs of a semi-truck's trailer, whereby the landing gear is operable by an electric motor that is regulated by the disclosed control system. Namely, the control system is provided as a security measure to permit coded entry access to the system, and motor operating parameters are sensed to prevent exceeding operating limits of the system.

U.S. Pat. No. 6,010,154 issued on Jan. 4, 2000 to inventors Christopher Kimpton Payne and George Kimpton Payne, Jr. for a "Trailer Landing Gear Device," which discloses a portable device for use by semi-trailer truck operators in raising or lowering a landing gear drive mechanism of a trailer prior to detachment from or after attachment to a semi-truck with virtually no modifications to the trailer. Namely, the disclosed device comprised of an elongated, rigid, cylindrical body incorporating a closed end portion that is couple-able to a rotatable drive shaft of a drive means, and also an open end portion that is adapted to releasably grip the end of a crank shaft of a landing gear drive mechanism. When the drive shaft of the drive means rotates, the device rotates, causing the crank shaft of the landing gear drive mechanism to rotate, thus effecting the raising or lowering of one or more landing gear legs of a trailer. The preferred embodiment encompasses two identical T-shaped slots on the open end portion so that the drive speed of the landing gear drive mechanism can be selected, while the closed end of the device encompasses a threaded hole.

U.S. Pat. No. 5,451,076 for a "Pneumatic Trailer Landing Gear," as invented by Paul Burkhead and issued to New Way Corporation on Sep. 19, 1995, discloses a pneumatic actuator for a trailer landing gear reduction assembly for directing the raising or lowering of the feet of a trailer, providing an alternative to the traditional hand crank methods. The disclosed invention comprises of a pneumatic motor, and air pressure is generated by the tractor through an air line, driving the disclosed actuator. Said invention may be incorporated onto an already existing trailer landing gear reduction assembly, or it may be milled directly thereon.

U.S. Pat. No. 4,097,840 for an "Automatic Semi-Trailer Landing Gear Extension and Retraction Apparatus," as issued to inventor Warner A. Chappelle on Jun. 27, 1978 discloses an apparatus for automatically extending and retracting the landing gear of a semi-trailer, suitable for use with a conventional tractor with an operator's cab, a source of electrical power, and a fifth wheel hitch member. The disclosed apparatus is further employed in conjunction with a semi-trailer including a hitch pin means on the forward end portion for engaging the fifth wheel hitch member of the conventional tractor, road wheels journaled on the rear end portion, and an alternately extendable and retractable landing gear that may be engaged by a crank handle for manual rotation. The invention namely discloses an automatic landing gear extension and retraction apparatus comprising of a reversible electric drive motor and an in-line speed reducer for extending and retracting a landing gear. An operator is able to control the extension and retraction of the landing gear from within the cab and, alternatively, from the exterior of the semi-trailer, via the provided electric circuitry, which further provides audible and visual indicators of the landing gear's position and status, automatically cutting off the electric motor when said landing gear is fully extended or retracted.

There is accordingly a need present for a way to operate landing-gear jacks with a motor, which should be portable enough to travel with the truck and able to fit and to operate a variety of jacks without altering, marring, or damaging the landing gear.

SUMMARY OF THE INVENTION

This invention provides a portable semi-trailer landing-gear motor system and method for use in raising and lowering landing gear on a variety of different semi-trailers, by use of motorized turning of the various-sized drive shafts of the landing gears in appropriate opposing directions, providing motorized performance of an otherwise physically difficult procedure, providing transportability and easy storage within a tractor or truck for use on a variety of semi-trailers in various locations and under various conditions.

BRIEF DESCRIPTION OF DRAWINGS

Reference will now be made to the drawings, wherein like parts are designated by like numerals, and wherein.

DETAILED DESCRIPTION OF THE INVENTION

Figure 1:
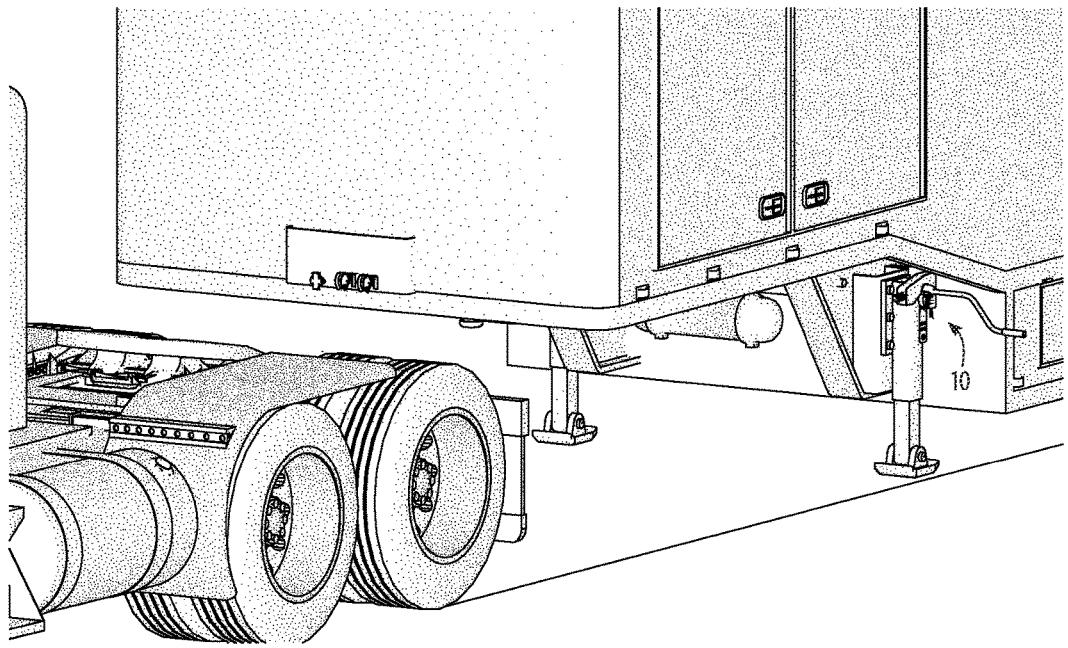
FIG. 1 is a schematic view of the portable semi-trailer landing-gear motor of the invention in use.

Referring to FIG. 1 and all of the figures generally, the portable semi-trailer landing-gear motor 10 of the invention is shown in use on the landing-gear jack of a semi-trailer being connected to or disconnected from a tractor or truck.

Figure 2:
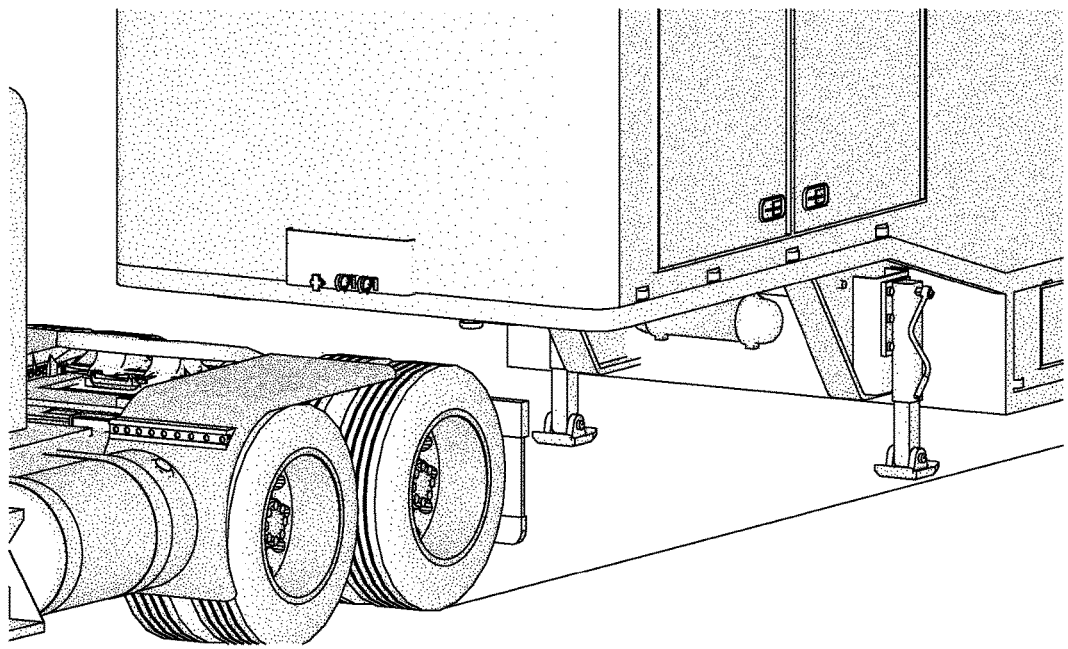
FIG. 2 is a schematic view of the environment within which the invention is used.

Referring additionally to FIG. 2, the landing-gear and jacking system of most semi-trailers is designed as a manual system, with a jack handle that can be removed or folded out of the way. There are variations in the specific designs and configurations of landing gear and jacking systems. The portable semi-trailer landing-gear motor 10 is able to fit onto and to operate a variety of such landing gear.

Figure 3:
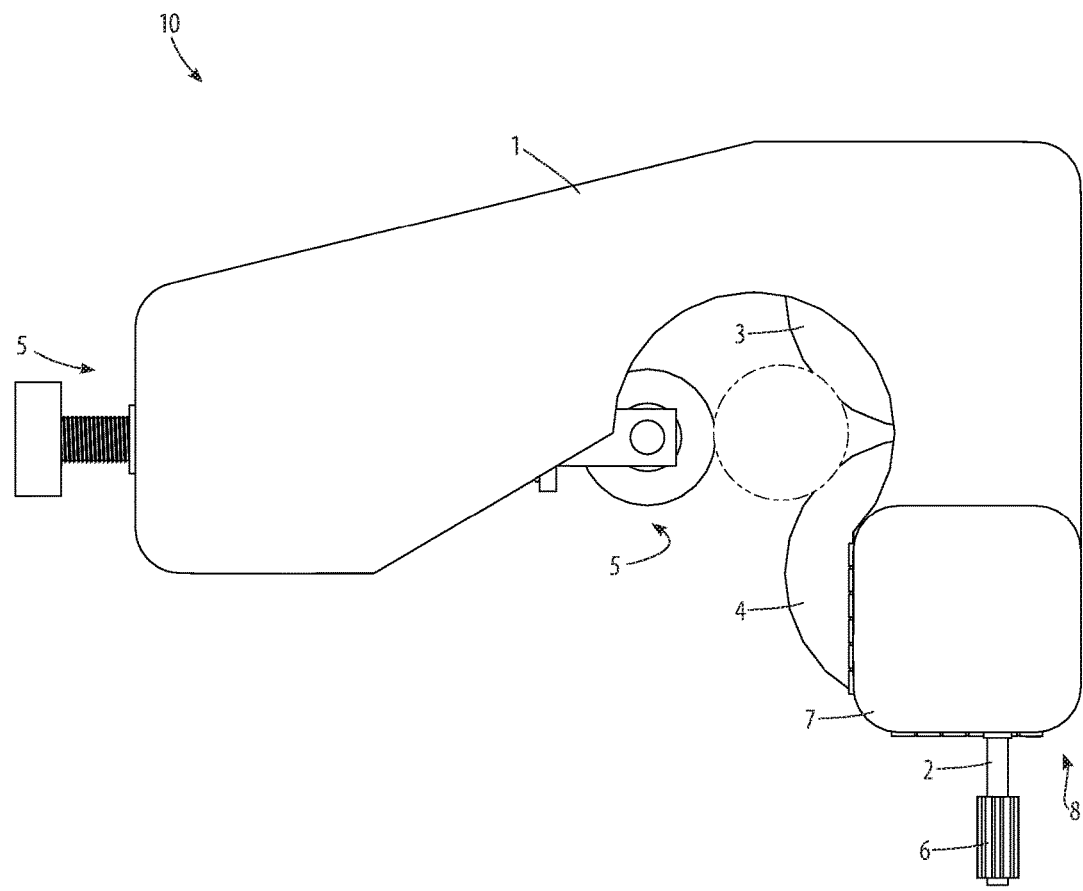
FIG. 3 is a front view of the portable semi-trailer landing-gear motor of the invention.
Figure 4:
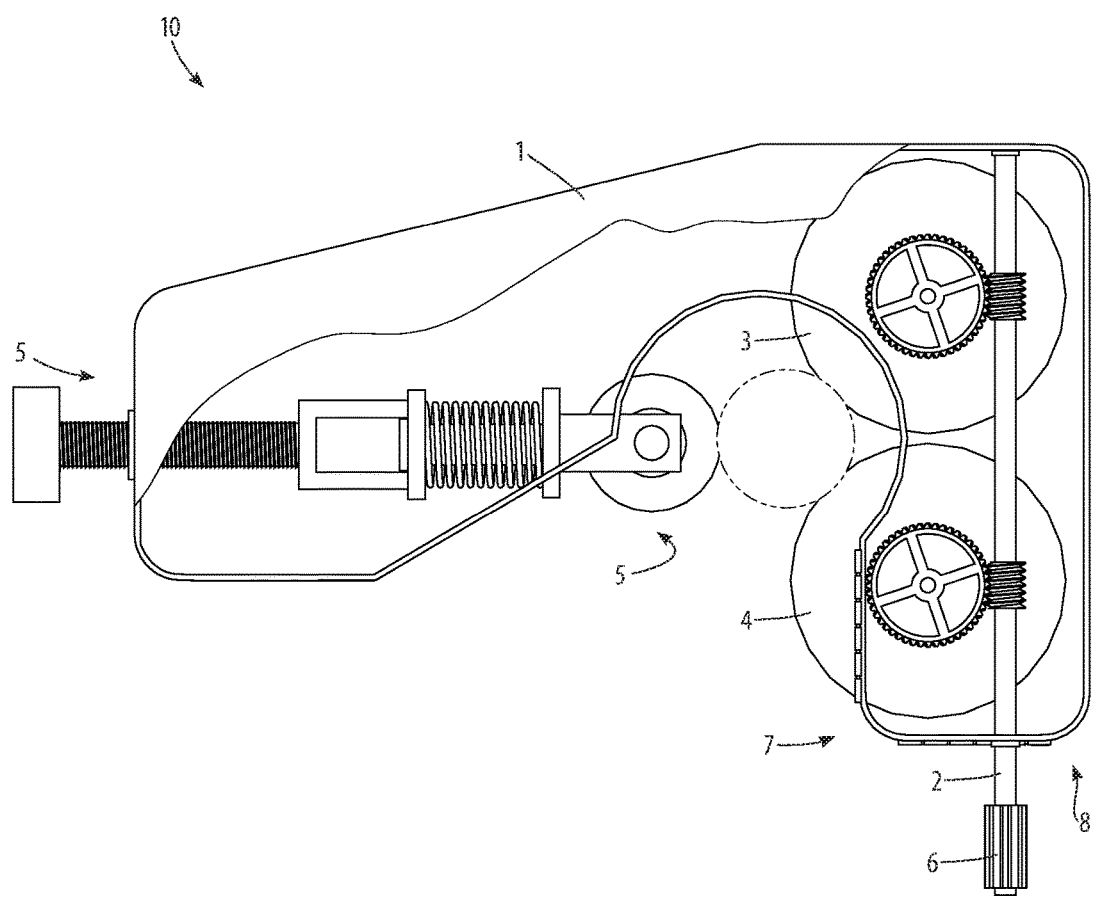
FIG. 4 is a cutaway front view of the portable semi-trailer landing-gear motor of the invention.

Referring to FIG. 3 & FIG. 4, the basic elements of the portable semi-trailer landing-gear motor 10 are a unit body 1, a worm drive 2, a first worm-gear roller 3, a second worm-gear roller 4, and a pressure-roller assembly 5. Optionally, but preferably, the portable semi-trailer landing-gear motor 10 also has a transfer gear 6, a handle support 7, and a motor-anchor support 8.

Figure 5:
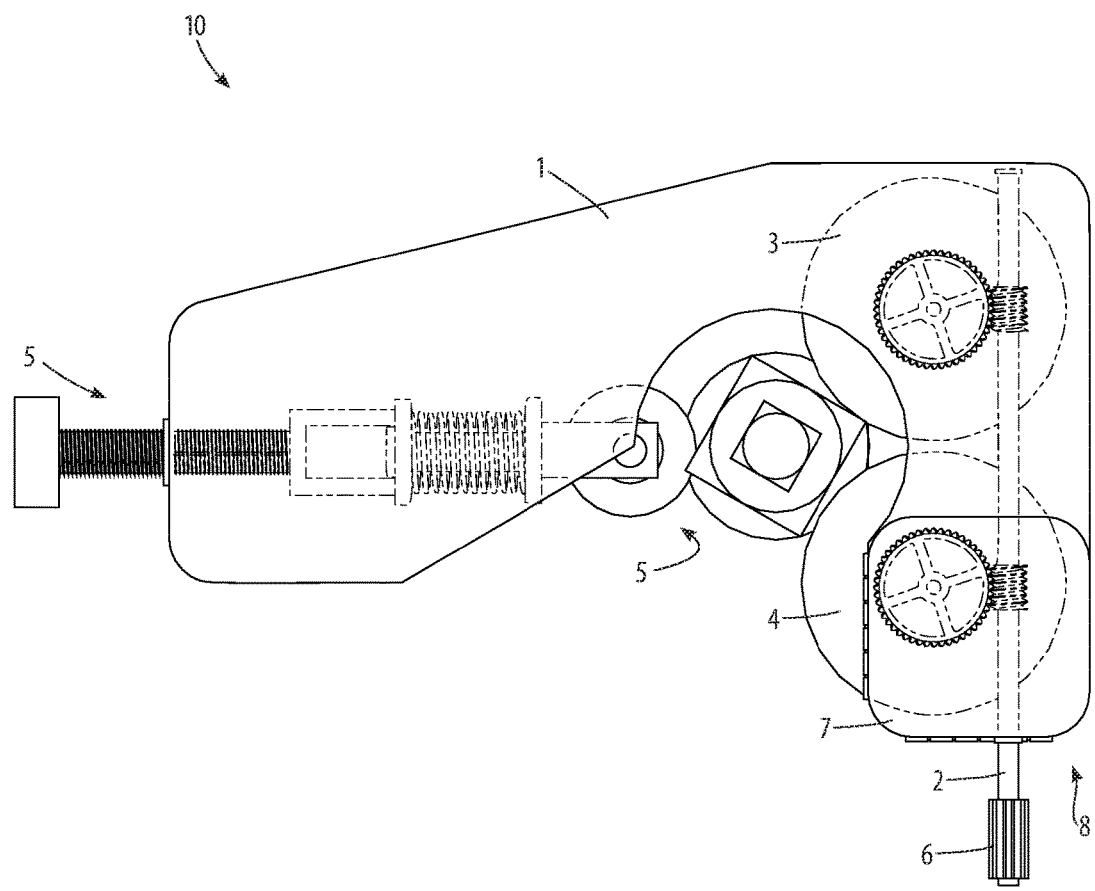
FIG. 5 is a hidden-line front view of the portable semi-trailer landing-gear motor of the invention, showing use on a variety of jack drive shaft cross sections.

Referring additionally to FIG. 5, the unit body 1 has a size and configuration adapted to temporary mounting and dismounting on the drive shaft of the landing gear. This requires a small size and compact configuration, since the jack handles for the landing gear are often placed close to the trailer and somewhat underneath. The unit body 1 has a central void area which allows placement over the drive shaft, with the drive shaft passing through the unit body. Inside the unit body are a first worm-gear roller 3 and a second worm-gear roller 4. These rollers make non-marring frictional contact with the drive shaft, which turns the drive shaft. As illustrated, a specific semi-trailer's drive shaft might be a round tube or a square tube, with circular or square cross sections. The diameter of round tube is usually between 0.75 inches and 1.5 inches, inclusive, and the inscribed circumferences of the square tubes fall in a similar range. The contact surfaces of the first and second worm-gear rollers 3, 4 should have a small amount of flexibility, allowing the drive shaft to push slightly into the roller for better frictional contact and to help accommodate any variations in the profile of the drive shaft, as seen particularly with square tubes. A hard, but somewhat deformable, rubber is a good material for the contact surface of the first and second worm-gear rollers 3, 4. The first and second worm-gear rollers 3, 4 are positioned so that they both contact the drive shaft, at a placement of about 120 degrees, as shown, and so that they can both be driven by the worm drive 2.

In use, the drive shaft is pressed against the first and second worm-gear rollers 3, 4 by a pressure-roller assembly 5, which provides an adjustment means, such as a threaded rod, for moving the assembly back and forth, and provides a spring section allowing for proud portions of the drive shaft, such as the corners of the square tube, to temporarily displace the pressure roller, which makes contact with the drive shaft and provides the pressure to ensure that the first and second worm-gear rollers 3, 4 are in good contact. The roller of the pressure-roller assembly contacts the drive shaft at a location about 120 degrees opposite each of the other two rollers.

A worm drive 2 extends through the unit body 1 as shown, and extends either directly or indirectly out of the unit body 1 so that the worm drive 2 can be rotationally driven by a motor. Optionally, the driven end of the worm drive 2 can have a transfer gear 6 or spindling to make good contact with the rotor of the motor. The worm drive 2 transfers the rotational force of the motor to the first and second worm-gear drives 3, 4, which change the direction of the force by 90 degrees, into a rotational force acting upon the drive shaft. The portable semi-trailer landing-gear motor 10 is designed to apply nominally right-handed force or left-handed force in order to lower or raise the landing gear, as appropriate. The motor should therefore supply rotational force in both directions.

Figure 6:
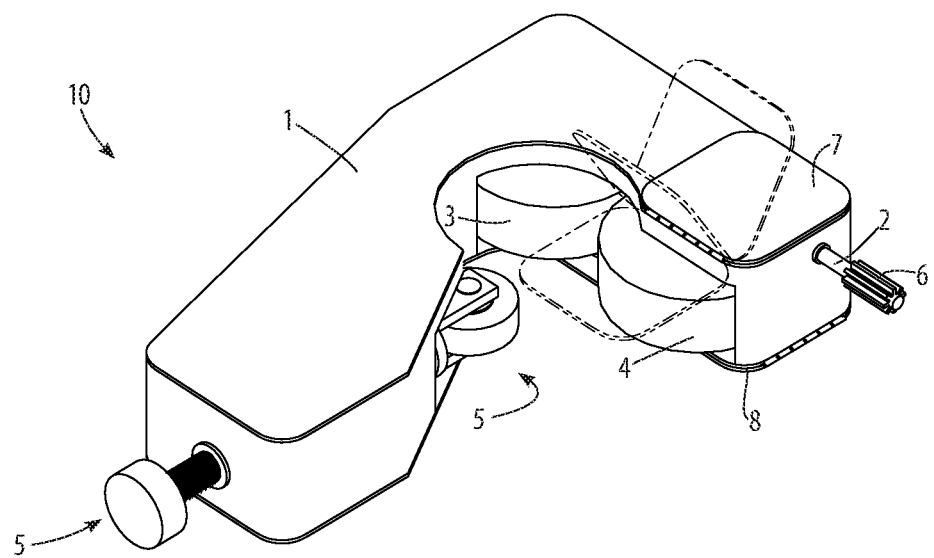
FIG. 6 is a perspective view of the portable semi-trailer landing-gear motor of the invention, showing operation of the handle support.

Referring now to FIG. 6, the portable semi-trailer landing-gear motor 10 is optionally but preferably provided with a handle support 7, as shown. The purpose of the handle support 7 is to support the handle extending from the drive shaft, in order to prevent a folded handle from being whipped around by the rotating drive shaft. In the preferred embodiment shown, the handle support 7 can be folded against the unit body 1 when not needed, such as for mounting or dismounting the portable semi-trailer landing-gear motor 10 from the landing gear.

Figure 7:
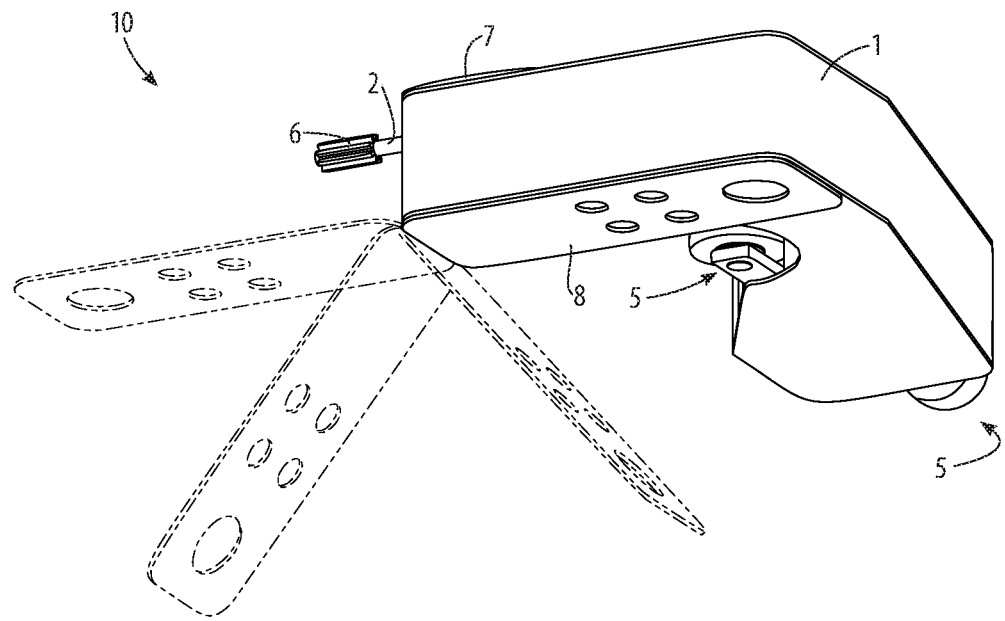
FIG. 7 is a perspective view of the portable semi-trailer landing-gear motor of the invention, showing operation of the motor-anchor support.
Figure 8:
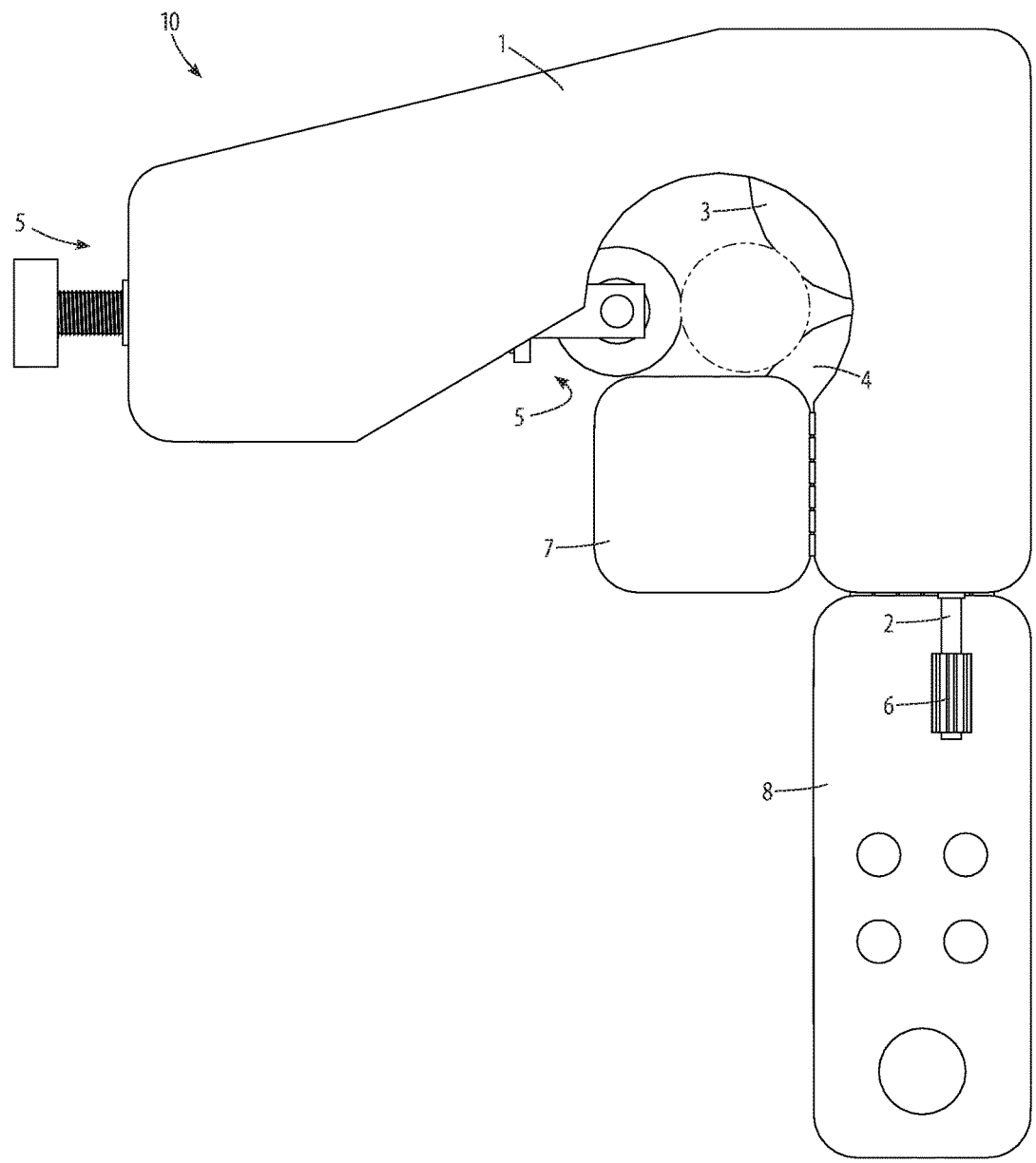
FIG. 8 is a front view of the portable semi-trailer landing-gear motor of the invention, showing the handle support and motor-anchor support extended.

Referring now to FIG. 7, the portable semi-trailer landing-gear motor 10 is optionally but preferably provided with a motor-anchor support 8, as shown. In the preferred embodiment shown, the motor-anchor support 8 can be folded against the unit body 1 in order to create a smaller unit during transport and storage. Referring additionally to FIG. 8, when deployed or extended, the motor-anchor support extends a distance from the drive shaft and rollers. This extension provides an advantage of leverage in anchoring the portable semi-trailer landing-gear motor 10 against any tendency to spin around the drive shaft. The motor-anchor support 8 also provides a place to mount the motor. The weight of a motor mounted on the motor-anchor support 8, in this leverage-advantaged position, will also tend to stabilize the portable semi-trailer landing-gear motor 10 against spinning. An attachment point in the form of a large hole in the far end of the motor-anchor support 8 allows for anchoring the portable semi-trailer landing-gear motor 10 through a strap, cable, or rod connected to a suitable stable structure, which will vary among different landing-gear designs. The motor-anchor support 8 might be attached to a landing gear leg itself, to another structure on the semi-trailer, or to the ground or an external structure. The portable semi-trailer landing-gear motor 10 can also be stabilized by suspending a sufficient weight from the motor-anchor support 8.

Figure 9:
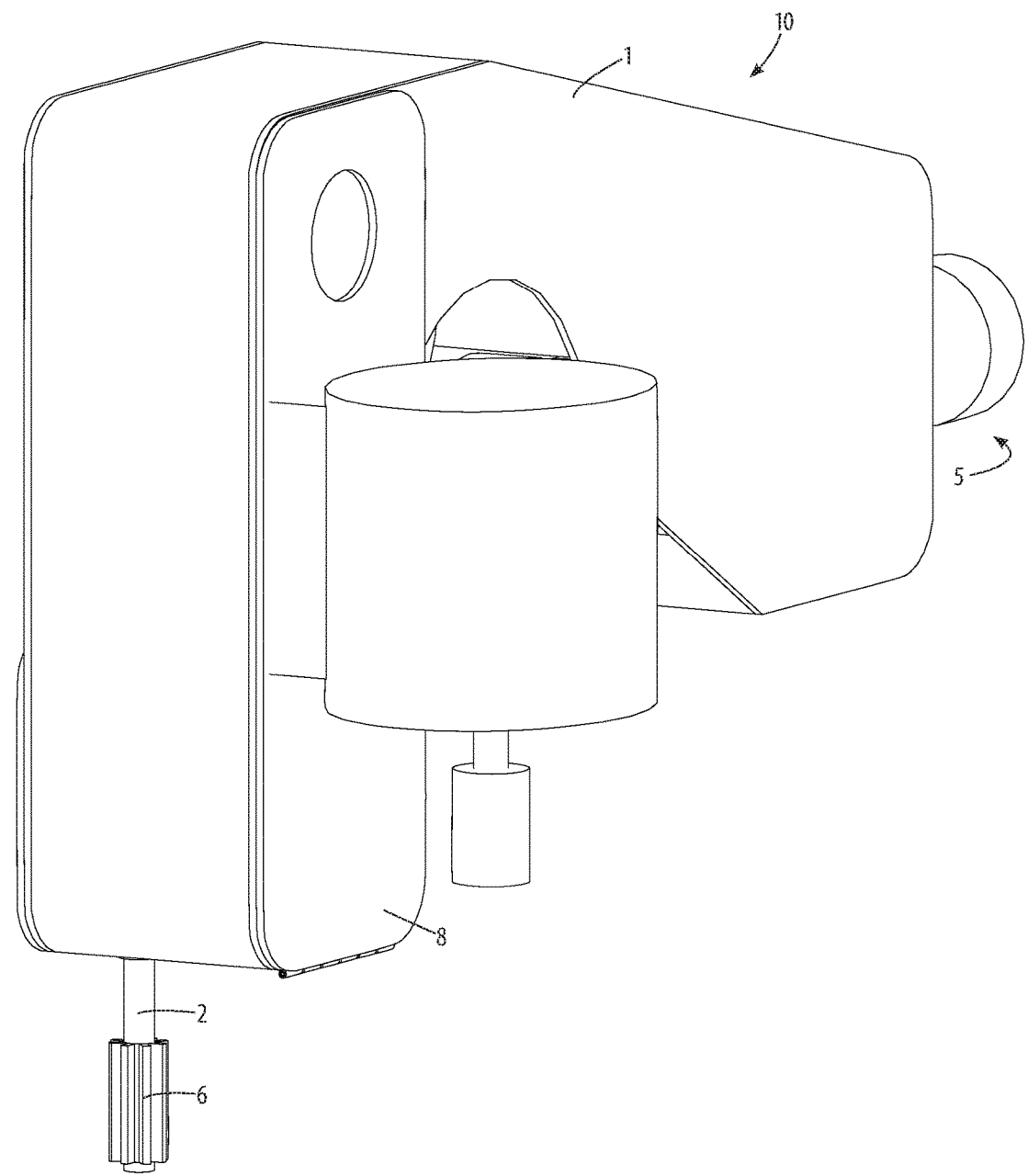
FIG. 9 is a perspective view of the portable semi-trailer landing-gear motor of the invention in use, showing attachment of a motor.
Figure 10:
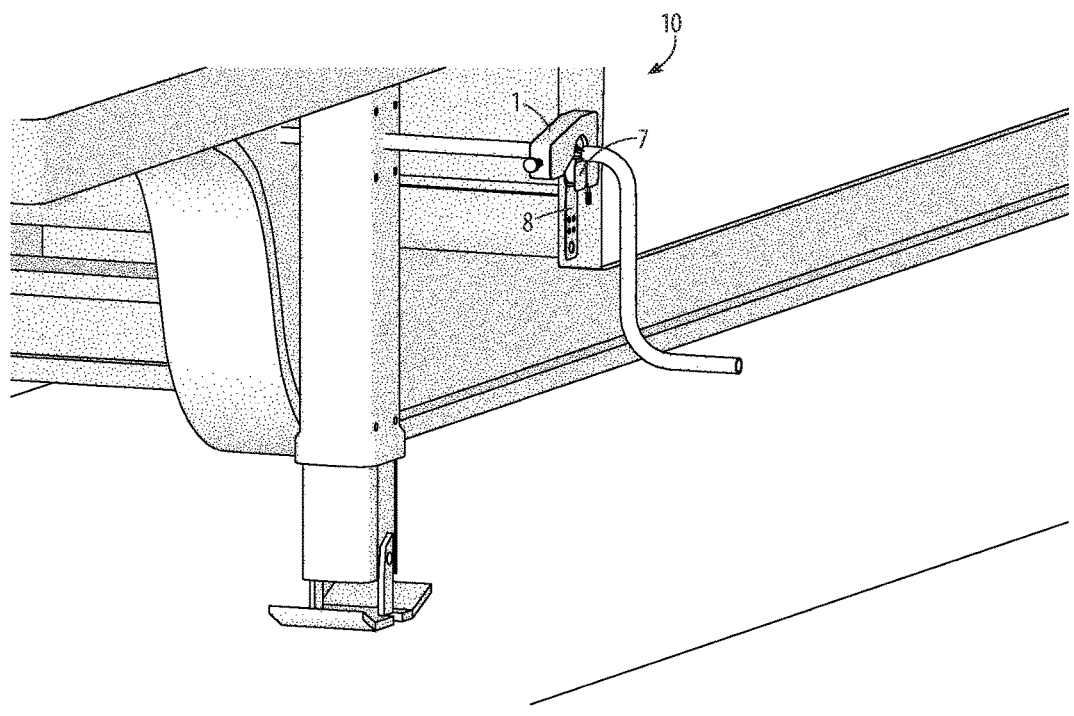
FIG. 10 is a schematic view of the portable semi-trailer landing-gear motor of the invention in use.

Referring now to FIG. 9, in a use of a preferred embodiment of the portable semi-trailer landing-gear motor 10 where a motor is mounted to the motor-anchor support 8, the folding of the motor-anchor support 8 against the unit body 1 allows for compact transport and storage. Additionally and in the alternative, there may be an additional support provided between the handle and shaft of the motor system 10 to allow for increased stability of the handle when in use.

Figure 11:
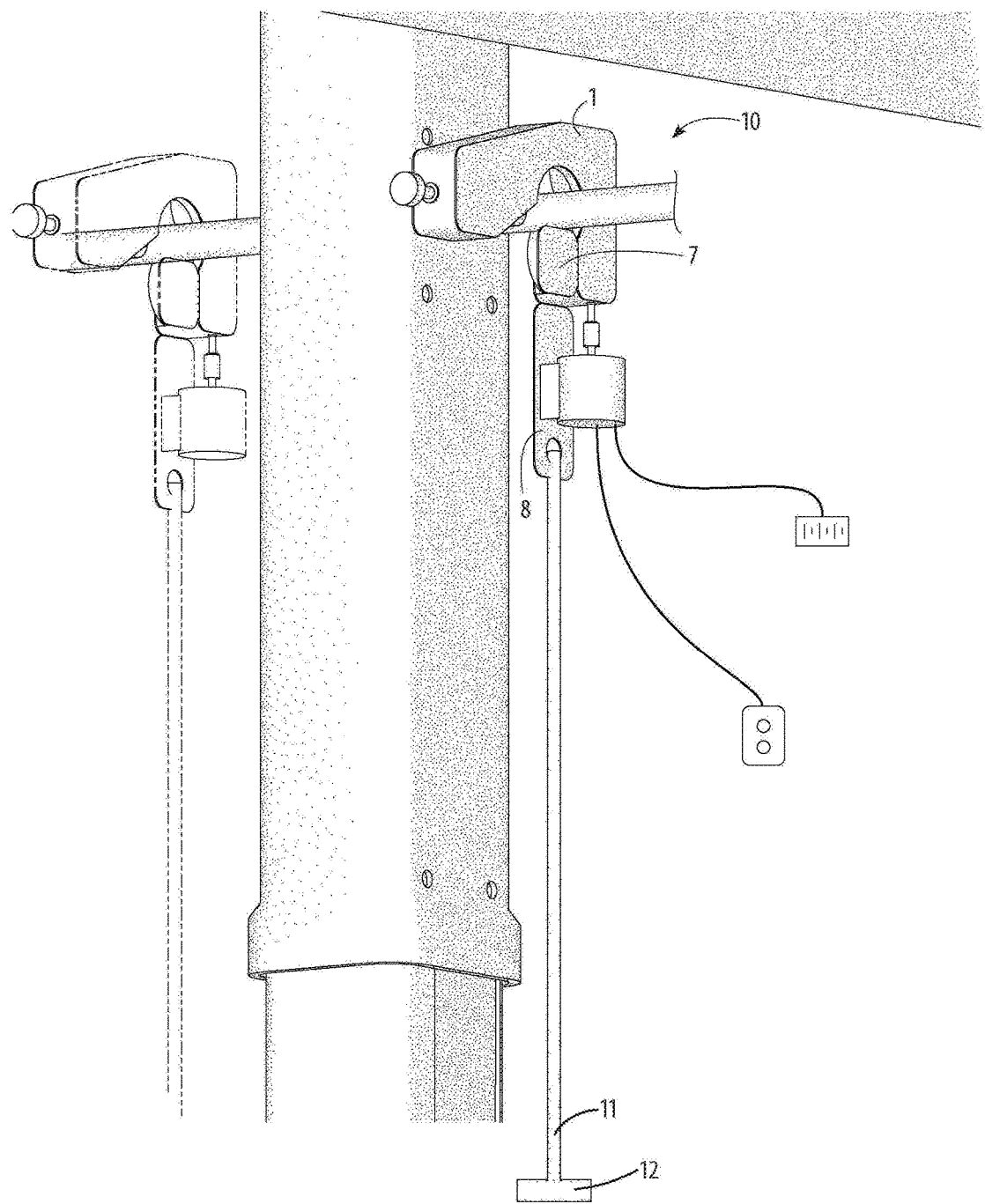
FIG. 11 is a schematic view of the portable semi-trailer landing-gear motor of the invention in use.

Referring now to FIG. 11, the motor used with the portable semi-trailer landing-gear motor 10 can be a battery powered motor, including a motor using the 24-volt system found on trucks. The motor can be controlled with a wired or wireless remote, allowing the trucker to stand away from the moving and rotating drive shaft and jack handle. The portable semi-trailer landing-gear motor 10 can also be operated using a hand-held rotating tool, such as a drill, as both the motor and the control. A sufficiently strong cordless drill could be used, in which case it would be advisable to connect to the worm-drive 2 or transfer gear 6 through a long, flexible driving cable.

As shown in FIG. 11, the portable semi-trailer landing-gear motor system may also feature an anti-torque leg 11 with a stabilizing mount 12, the stabilizing mount 12 designed to be placed on the ground while in use, to assist the user of the system while in use. Alternatively, the system may feature two anti-torque legs designed to straddle the jack of the system, which would also serve to provide an anti-torque effect to the system while in use.

The portable semi-trailer landing-gear motor 10 allows for mounting at a variety of locations on a drive shaft, including on the far side of or between the landing-gear jacking legs.

Many other changes and modifications can be made in the system and method of the present invention without departing from the spirit thereof. I therefore pray that my rights to the present invention be limited only by the scope of the appended claims.

I claim:

1. A portable semi-trailer landing-gear motor system for use in raising and lowering landing gear on a variety of different semi-trailers by motorized turning of various-sized drive shafts of the landing gears in appropriate opposite directions, the portable semi-trailer landing-gear motor comprising:
   (i) a unit body having a size and configuration adapted to temporary mounting and dismounting on the drive shaft of the landing gear, and having a central void area adapted to accommodate the passing through of the drive shaft;
   (ii) a worm drive extending through said unit body having an end accessible from outside said unit body, adapted to be driven by a motor;
   (iii) a first worm-gear roller adapted to transfer rotational force from said worm drive and applying such rotational force to the drive shaft of the landing gear through frictional contact at a first position;
   (iv) a second worm-gear roller adapted to transfer rotational force from said worm drive and applying such rotational force to the drive shaft of the landing gear through frictional contact at a second position located generally 120 degrees on the circumference of the drive shaft from said first position; and
   (v) a pressure-roller assembly contacting the drive shaft at a third position located generally 120 degrees on the circumference of the drive shaft from both said first and second positions, adapted to provide adjustable and spring-loaded force on the drive shaft toward both said first worm-gear roller and said second worm-gear roller;
   where, in use, said unit body is placed upon the drive shaft of the landing gear with the drive shaft in contact with both said first and second worm-gear rollers, said pressure-roller assembly is adjusted to allow frictional rotation of the drive shaft, rotational force from the motor, in an appropriate direction, is applied to said worm drive, the rotational force is transferred through frictional contact of said first and second worm-gear rollers with the drive shaft, and the drive shaft is turned in the appropriate direction to raise or lower the landing gear of the semi-trailer.

2. The portable semi-trailer landing-gear motor system of claim 1, further comprising a transfer gear mounted upon said worm drive at an end accessible from outside said unit body, adapted to facilitate transfer of rational force in the appropriate direction from a motor to said first and second worm-gear rollers.

3. The portable semi-trailer landing-gear motor system of claim 1, further comprising a handle support adapted to being moved into place to support a handle of a drive shaft by providing a boundary across said central void area of said unit body.

4. The portable semi-trailer landing-gear motor system of claim 1, further comprising a motor-anchor support adapted to being moved into place to provide a surface for mounting the motor and to provide a point of attachment for a stabilizing means attached at the other end to a weight, to the semi-trailer, or to the ground or other stable structure.

5. The portable semi-trailer landing-gear motor system of claim 1, where said unit body having a size and configuration adapted to temporary mounting and dismounting on the drive shaft of the landing gear further comprises a size and configuration adapted to fit into a variety of tight spaces around various drive shafts of various semi-trailers.

6. The portable semi-trailer landing-gear motor system of claim 1, where said unit body further comprises having a size and configuration adapted to provide transportability and storage in a tractor vehicle for use on a variety of different semi-trailers in a variety of locations and conditions.

7. The portable semi-trailer landing-gear motor system of claim 1, where said first and second worm-gear rollers further comprise non-marring surfaces in contact with the drive shaft.

8. The portable semi-trailer landing-gear motor system of claim 1, where said first and second worm-gear rollers further comprise surfaces in contact with the drive shaft made of hard rubber material.

9. The portable semi-trailer landing-gear motor system of claim 1, where said pressure-roller assembly further comprises a spring adapted to accommodate uneven circumferential surfaces of various drive shafts.

10. The portable semi-trailer landing-gear motor system of claim 1, where the motor supplying rotation force to said worm drive is a hand-held tool.

11. A portable semi-trailer landing-gear motor method for use in raising and lowering landing gear on a variety of different semi-trailers by motorized turning of various-sized drive shafts of the landing gears in appropriate opposing directions, comprising:
(i) providing a portable semi-trailer landing-gear motor, in turn comprising:
   (a) a unit body having a size and configuration adapted to temporary mounting and dismounting on the drive shaft of the landing gear, and having a central void area adapted to accommodate the passing through of the drive shaft;
   (b) a worm drive extending through said unit body having an end accessible from outside said unit body, adapted to be driven by a motor;
   (c) a first worm-gear roller adapted to transfer rotational force from said worm drive and applying such rotational force to the drive shaft of the landing gear through frictional contact at a first position;
   (d) a second worm-gear roller adapted to transfer rotational force from said worm drive and applying such rotational force to the drive shaft of the landing gear through frictional contact at a second position located generally 120 degrees on the circumference of the drive shaft from said first position; and
   (e) a pressure-roller assembly contacting the drive shaft at a third position located generally 120 degrees on the circumference of the drive shaft from both said first and second positions, adapted to provide adjustable and spring-loaded force on the drive shaft toward both said first worm-gear roller and said second worm-gear roller;
(ii) placing said unit body upon the drive shaft of the landing gear with the drive shaft in contact with both said first and second worm-gear rollers;
(iii) adjusting said pressure-roller assembly to allow frictional rotation of the drive shaft;
(iv) applying rotational force from the motor, in an appropriate direction, to said worm drive;
where the rotational force is transferred through frictional contact of said first and second worm-gear rollers with the drive shaft, and the drive shaft is turned in the appropriate direction to raise or lower the landing gear of the semi-trailer.

12. The portable semi-trailer landing-gear motor method of claim 11, where said portable semi-trailer landing-gear motor system further comprises a transfer gear mounted upon said worm drive at an end accessible from outside said unit body, adapted to facilitate transfer of rotational force in the appropriate direction from a motor to said first and second worm-gear rollers.

13. The portable semi-trailer landing-gear motor method of claim 11, where said portable semi-trailer landing-gear motor system further comprises a handle support adapted to being moved into place to support a handle of a drive shaft by providing a boundary across said central void area of said unit body.

14. The portable semi-trailer landing-gear motor method of claim 11, where said portable semi-trailer landing-gear motor system further comprises a motor-anchor support adapted to being moved into place to provide a surface for mounting the motor and to provide a point of attachment for a stabilizing means attached at the other end to a weight, to the semi-trailer, or to the ground or other stable structure.

15. The portable semi-trailer landing-gear motor method of claim 11, where said unit body having a size and configuration adapted to temporary mounting and dismounting on the drive shaft of the landing gear further comprises a size and configuration adapted to fit into a variety of tight spaces around various drive shafts of various semi-trailers.

16. The portable semi-trailer landing-gear motor method of claim 11, where said unit body further comprises having a size and configuration adapted to provide transportability and storage in a tractor vehicle for use on a variety of different semi-trailers in a variety of locations and conditions.

17. The portable semi-trailer landing-gear motor method of claim 11, where said first and second worm-gear rollers further comprise non-marring surfaces in contact with the drive shaft.

18. The portable semi-trailer landing-gear motor method of claim 11, said first and second worm-gear rollers further comprise surfaces in contact with the drive shaft made of hard rubber material.

19. The portable semi-trailer landing-gear motor method of claim 11, where said pressure-roller assembly further comprises a spring adapted to accommodate uneven circumferential surfaces of various drive shafts.

20. The portable semi-trailer landing-gear motor method of claim 11, where the motor supplying rotation force to said worm drive is a hand-held tool.

* * * * *